United States Patent Office 3,551,273
Patented Dec. 29, 1970

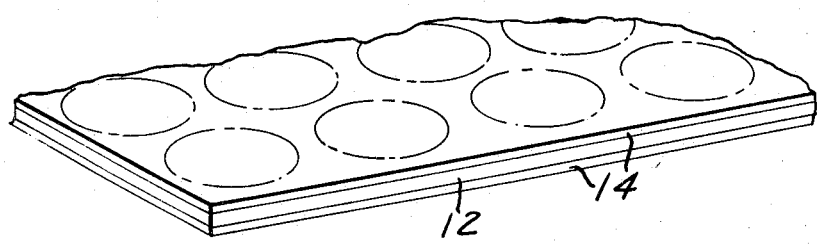
Fig. 1.
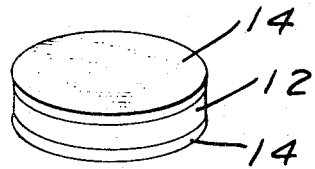
Fig. 2.
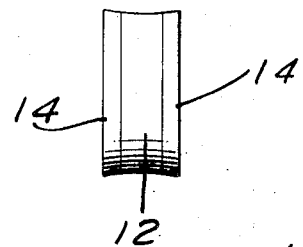
Fig. 3.
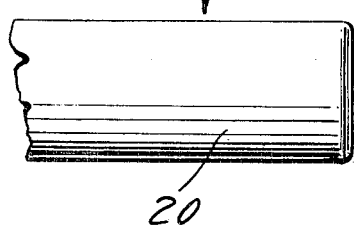
Fig. 4.
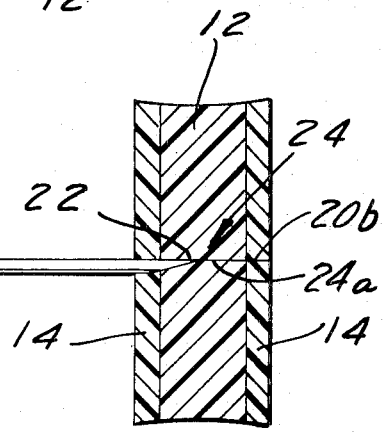
Carlton B. McKinney
INVENTOR.

3,551,273
SEPTUM FOR USE IN A GAS CHROMATOGRAPH
Carlton B. McKinney, Los Angeles, Calif., assignor to Hamilton Company, Inc., Whittier, Calif., a corporation of California
Filed Oct. 15, 1965, Ser. No. 496,337
Int. Cl. B32b 7/02; B65d 39/02
U.S. Cl. 161—166
8 Claims

ABSTRACT OF THE DISCLOSURE

A septum or seal for chromatograph inlets, said seal having three layers of silicone rubber, the inner layer being of relatively thick, soft rubber and the outside layers being thinner and of harder rubber. The relatively soft inner layer clings to a needle thrust therethrough and returns quickly to its original shape when the needle is withdrawn, preventing sample "blow back."

---

This invention relates generally to sealing devices and relates more particularly to septum or sealing diaphragms for scientific equipment and instruments.

While the invention has particular utility in connection with septums for scientific equipment and instruments such as chromatographs and is disclosed herein in such connection it is to be understood that its utility is not confined thereto.

In certain chromatographic equipment needles of syringes for very accurately measuring and dispensing very small quantities of samples into such equipment, particularly minute samples in gas chromatography, must be forced through the septum and heretofore there has been a problem preventing leakage past the needle. This problem has been particularly serious when the needle is removed or pulled from the septum after the sample has been injected into the apparatus.

It is therefore an object of the invention to provide a septum that overcomes the above referred to problem and difficulties thereof.

It is another object of the invention to provide a septum of this character through which a needle may be readily pushed and which will provide an effective seal about the needle when extending through said septum for discharge of a sample or the like into the apparatus.

Still another object of the invention is to provide a septum of this character that closes the needle puncture opening very quickly as the needle is withdrawn from the septum thereby preventing fluid, such as gas, from blowing out or air from being pulled or drawn in and thereby providing extreme accuracy in the experiment or test or the like being conducted.

A further object of the invention is to provide a septum of this character that has a relatively long usage life, that is may be penetrated by a needle a great number of times.

A still further object of the invention is to provide a septum of this character that is rugged and reliable.

Another object of the invention is to provide a device of this character that has a relatively soft central part, layer or ply, and an outer harder layer at each side of the central layer.

The soft central layer provides an extremely effective seal about a needle and closes the needle puncture very quickly when the needle is withdrawn.

The outer harder layers keep the central layer from extruding or deforming.

Still another object of the invention is to provide a septum having the advantages of soft resilient material and harder, form preserving and extrusion preventing material in one unit.

A further object of the invention is to provide a septum of this character which prevents particles of soft material of the septum that might cling to the needle and be carried thereby as it passes through said soft material from being carried into a chromatograph or other instrument with which the septum is being used.

A still further object of the invention is to provide a septum of this character that is relatively inexpensive to manufacture.

The characteristics and advantages of the invention are further sufficiently referred to in connection with the following detailed description of the accompanying drawings which represent one embodiment. After considering this example, skilled persons will understand that many variations may be made without departing from the principles disclosed and I contemplate the employment of any structures, arrangements or modes of operation that are properly within the scope of the appended claims.

Referring to the drawings, which are for illustrative purposes only:

FIG. 1 is a perspective view of a portion of a sheet of septum material;

FIG. 2 is an enlarged perspective view of a septum embodying the present invention;

FIG. 3 is an enlarged edge view; and

FIG. 4 is an enlarged sectional view of the septum with the needle of a syringe partly removed therefrom.

Referring more particularly to the drawings, the septum is indicated generally at 10, in FIGS. 1 and 2.

It comprises a plurality of layers of rubber, three layers being shown. The inner layer is indicated at 12 and the outer layers are indicated at 14. In other words the septum is laminated with the central layer or lamination relatively soft and the outer layers or laminations relatively hard.

When a needle is pushed through the septum the central layer provides the principal sealing portion and because it is relatively soft, seals effectively about the needle.

When the needle is removed the relatively soft central layer closes the needle puncture very quickly, almost instantly in fact, so that gas or other fluid in the instrument or apparatus will not blow out either about the needle or through the needle puncture, nor will air be pulled or drawn in past the needle or through the needle puncture.

The hard outer laminations prevent the inner or soft central lamination from extruding.

Referring to FIG. 4 there is shown a needle 16 of a syringe of any suitable character such as a measuring syringe for example, indicated generally at 18, having a barrel 20 in the forward end of which a rear end portion of said needle is secured in the usual well known manner.

The needle is shown partly withdrawn with the free tip end or point 22 still in the soft central layer of rubber 12. The line indicated generally at 24 indicates the needle puncture ahead of the needle tip or that portion of the needle puncture from which the needle has been withdrawn. The portion of the needle puncture of the central lamination from which the needle has been withdrawn, as indicated at 24a, has already tightly closed or sealed the puncture and continues to close into the puncture as the needle is further withdrawn so that fluid from the apparatus being used cannot escape. The portion 24b of the needle puncture from which the needle has been withdrawn is in the outer layer or lamination and is also closed.

By having a relatively thick septum sufficient time elapses for the material of the septum to expand resiliently to seal the needle puncture as the needle is being withdrawn to effectively seal said puncture before the needle has been fully withdrawn.

By way of example of the materials used and method of making septums embodying the present invention, the central layer or lamination is soft silicone rubber comprising an unfilled compound 30±5 Shore A of .075" minimum thickness. The outer layers are hard red filled compound 60±5 Shore A and said outer layers are substantially thinner than the central layer as shown in the drawings.

Laminated sheets 6" long x 6" wide x .150"±.015" thick of material for the septums are molded. The material for the respective laminations is put into a mold in liquid form, first an outer layer, then the central layer, and then the other outer layer. The rubber is then cured in the usual manner and the septums of the desired size or sizes are cut from these sheets, as indicated by the dot-dash lines 30 in FIG. 1.

It is to be understood, of course, that other elastomers having similar characteristics may be used.

When cutting the septums from the sheets the periphery may be slightly concave, as shown in FIG. 4. In cutting the septums from the large sheet there is some compression of the material by the cutting tool with the result that the peripheral edge is slightly concave, as shown in FIG. 4. However, straight sides or peripheral edges are equally desirable and the septums will work very satisfactorily with either type of edge.

The invention and its attendant advantages will be understood from the foregoing description and it will be apparent that various changes may be made in the form, construction and arrangement of the parts of the invention without departing from the spirit and scope thereof or sacrificing its material advantages, the arrangement hereinbefore described being merely by way of example, and I do not wish to be restricted to the specific form shown or uses mentioned except as defined in the accompanying claims, wherein various portions have been separated for clarity of reading and not for emphasis.

I claim:
1. In a laminated rubber septum for use in a gas chromatograph:
   (A) a central layer of relatively soft rubber;
   (B) and an outer layer at each side of said central layer, said outer layers being of harder rubber then said central layer,
   (C) said outer layers being in bonded relationship to the central layer, and
   (D) said rubber comprises silicone rubber.
2. The invention defined by claim 1, wherein the central layer comprises unfilled silicone rubber.
3. The invention defined by claim 1, wherein the outer layers comprise filled silicone rubber.
4. The invention defined by claim 1, wherein the central layer comprises unfilled silicone rubber and the outer layers comprise filled silicone rubber.
5. The invention defined by claim 1 wherein the central layer is a soft unfilled silicone rubber compound 30±5 Shore A of a minimum thickness of .075", and the outer layers comprise a hard filled silicone rubber compound 60±5 Shore A.
6. The invention defined by claim 5 wherein the thickness of the septum is .150"±.015" and the thickness of each of the outer layers is approximately half the thickness of the central layer.
7. The invention defined by claim 2 wherein the outer layers are substantially thinner than the central layer.
8. The invention defined by claim 2, wherein the septum is flat, and wherein the rubber comprises silicone rubber, the central layer being of unfilled silicone rubber and the outer layers comprise filled silicone rubber and said outer layers are thinner than the central layer.

References Cited
UNITED STATES PATENTS

| | | | |
|---|---|---|---|
| 2,781,288 | 2/1957 | Polmanteer | 161—208 |
| 3,092,278 | 6/1963 | Järnhäll | 215—48 |
| 2,039,401 | 5/1936 | Foges | 161—240X |
| 2,411,116 | 11/1946 | Sanz | 161—405X |

OTHER REFERENCES

Rochow, Chemistry of the Silicones (1951) p. 95.

JOHN T. GOOLKASIAN, Primary Examiner

G. W. MOXON II, Assistant Examiner

U.S. Cl. X.R.

161—166, 206, 405; 215—51